US010996888B2

(12) United States Patent
Bains et al.

(10) Patent No.: US 10,996,888 B2
(45) Date of Patent: May 4, 2021

(54) WRITE CREDITS MANAGEMENT FOR NON-VOLATILE MEMORY

(71) Applicant: QUALCOMM Incorporated, San Diego, CA (US)

(72) Inventors: Kuljit Singh Bains, Olympia, WA (US); Raj Ramanujan, Federal Way, WA (US); Wesley Queen, Raleigh, NC (US); Liyong Wang, Cary, NC (US)

(73) Assignee: Qualcomm Incorporated, San Diego, CA (US)

( * ) Notice: Subject to any disclaimer, the term of this patent is extended or adjusted under 35 U.S.C. 154(b) by 67 days.

(21) Appl. No.: 16/175,381

(22) Filed: Oct. 30, 2018

(65) Prior Publication Data

US 2019/0129656 A1   May 2, 2019

Related U.S. Application Data

(60) Provisional application No. 62/579,715, filed on Oct. 31, 2017.

(51) Int. Cl.
*G06F 3/06* (2006.01)
*G06F 11/10* (2006.01)
*G06F 13/16* (2006.01)

(52) U.S. Cl.
CPC .......... *G06F 3/0659* (2013.01); *G06F 3/0613* (2013.01); *G06F 3/0619* (2013.01); *G06F 3/0673* (2013.01); *G06F 3/0679* (2013.01); *G06F 11/1004* (2013.01); *G06F 11/1048* (2013.01); *G06F 13/1694* (2013.01)

(58) Field of Classification Search
CPC .... G06F 3/0659; G06F 3/0613; G06F 3/0673; G06F 3/0619; G06F 3/0679; G06F 11/1004; G06F 11/1048; G06F 13/1694; G06F 13/1673
See application file for complete search history.

(56) References Cited

U.S. PATENT DOCUMENTS

| 7,702,871 | B1 * | 4/2010 | Arnon | G06F 3/0614 |
| | | | | 711/167 |
| 10,452,529 | B1 * | 10/2019 | Davis | G06F 9/5016 |
| 2007/0220201 | A1 * | 9/2007 | Gill | G06F 12/123 |
| | | | | 711/113 |

(Continued)

OTHER PUBLICATIONS

What you can do with NVDIMMS by Peglar 2019 (Year: 2019).*

(Continued)

*Primary Examiner* — Paul M Knight
(74) *Attorney, Agent, or Firm* — Muncy, Geissler, Olds & Lowe, P.C.

(57) ABSTRACT

Systems and methods for synchronizing write credits between a host device and a media controller of a memory system comprising a non-volatile memory (NVM), wherein the host device is configured to maintain a write credit (WC) counter implemented in a memory controller of the host device. The WC counter tracks and limits the number of outstanding write commands which may be issued to the NVM. The host device may query the memory system to obtain status of the available write buffer space in the media controller, and adjust the WC counter based on any detected errors in the write buffer space reported in metadata of read packets sent from the memory system.

27 Claims, 6 Drawing Sheets

| Poison | WC2 | WC1 | WC0 | Comment |
|---|---|---|---|---|
| 0 | 0 | 0 | 0 | No Credit Return |
| 0 | Credit | | | XWRITE Credit |
| 1 | 0 | 0 | 0 | Poison |
| 1 | Credit(non Zero value) | | | PWRITE Credit |

| Poison | PWC | Comment |
|---|---|---|
| 0 | 0 | No Credit Return |
| 1 | 1 | XWRITE credit return |
| 1 | 0 | Poison |
| 1 | 1 | PWRITE Credit |

| Poison | WC[2:0] | | | XWRITE Credit Value |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 4 |
| 0 | 1 | 0 | 0 | 8 |
| 0 | 1 | 0 | 1 | 16 |
| 0 | 1 | 1 | 0 | 32 |
| 0 | 1 | 1 | 1 | 64 |

| Poison | WC[2:0] | | | PWRITE Credit Value |
|---|---|---|---|---|
| 1 | 0 | 0 | 0 | Poison |
| 1 | 0 | 0 | 1 | 1 |
| 1 | 0 | 1 | 0 | 2 |
| 1 | 0 | 1 | 1 | 4 |
| 1 | 1 | 0 | 0 | 8 |
| 1 | 1 | 0 | 1 | 16 |
| 1 | 1 | 1 | 0 | 32 |
| 1 | 1 | 1 | 1 | 64 |

(56) References Cited

U.S. PATENT DOCUMENTS

| | | | |
|---|---|---|---|
| 2010/0110748 A1 | 5/2010 | Best et al. | |
| 2012/0239833 A1* | 9/2012 | Yoshimura | G06F 3/0673 710/52 |
| 2012/0260146 A1* | 10/2012 | Lee | G06F 11/108 714/763 |
| 2013/0219234 A1* | 8/2013 | Shetty | G06F 11/008 714/708 |
| 2015/0121149 A1* | 4/2015 | Cooke | G06F 11/0745 714/43 |
| 2016/0139807 A1* | 5/2016 | Lesartre | G11C 5/04 711/154 |
| 2016/0179742 A1* | 6/2016 | Nale | G06F 12/023 711/147 |
| 2017/0255418 A1 | 9/2017 | Niu et al. | |
| 2017/0322845 A1* | 11/2017 | Nomura | G06F 11/1076 |
| 2018/0329651 A1* | 11/2018 | Chang | G06F 3/0659 |
| 2019/0079864 A1* | 3/2019 | Shi | G06F 12/126 |
| 2019/0087096 A1* | 3/2019 | Ramanujan | G06F 12/0862 |
| 2019/0339865 A1* | 11/2019 | Bains | G06F 3/0656 |

OTHER PUBLICATIONS

JEDEC: DDR5 to Double Bandwidth Over DDR4, NVDIMM-P Specification Due Next Year (Year: 2017).*
International Search Report and Written Opinion—PCT/US2018/058343—ISA/EPO—dated Feb. 12, 2019.

* cited by examiner

| Data Beat | | | | | | | | |
|---|---|---|---|---|---|---|---|---|
| Pin | UI0 | UI1 | UI2 | UI3 | UI4 | UI5 | UI6 | UI7 |
| CB7 | Poison | WC2 | WC1 | WC0 | RID7 | RID6 | RID5 | RID4 |
| CB6 | User3 | User2 | User1 | User0 | RID3 | RID2 | RID1 | RID0 |

*FIG. 2A*

| Data Beat | | | | | | | | |
|---|---|---|---|---|---|---|---|---|
| Pin | UI0 | UI1 | UI2 | UI3 | UI4 | UI5 | UI6 | UI7 |
| CB7 | Poison | PWC | User5 | User4 | RID7 | RID6 | RID5 | RID4 |
| CB6 | User3 | User2 | User1 | User0 | RID3 | RID2 | RID1 | RID0 |

*FIG. 2B*

| Write Credit Bit | | | Credits |
|---|---|---|---|
| WC2 | WC1 | WC0 | |
| 0 | 0 | 0 | 0 |
| 0 | 0 | 1 | 1 |
| 0 | 1 | 0 | 2 |
| 0 | 1 | 1 | 4 |
| 1 | 0 | 0 | 8 |
| 1 | 0 | 1 | 16 |
| 1 | 1 | 0 | 32 |
| 1 | 1 | 1 | 64 |

*FIG. 2C*

|   | HOST COUNT | WRITES ISSUED | CREDIT RETURNED | | Available for return |
|---|---|---|---|---|---|
|   |   |   | STATUS READ | READ Metadata |   |
| 1 | 64 |   |   |   |   |
| 2 |   | 8 |   |   |   |
| 3 | 56 |   |   |   |   |
| 4 |   |   | 60 | 4 | 4 |
| 5 | 60 |   |   |   |   |
| 6 |   | 12 |   |   |   |
| 7 | 48 |   |   |   |   |
| 8 |   |   | 56 | 8 | 8 |
| 9 | 56 |   |   |   |   |
| 10 |   |   | 61 | 4 | 5 |
| 11 | 61 or 60 |   |   |   |   |
| 12 |   |   | 64 | 2 | 3 |
| 13 | 64 or 63 |   |   |   |   |

*FIG. 3A*

|   | HOST COUNT | WRITES ISSUED | CREDIT RETURNED | | Available for return |
|---|---|---|---|---|---|
|   |   |   | STATUS READ | READ Metadata |   |
| 1 | 64 |   |   |   |   |
| 2 |   | 8 |   |   |   |
| 3 | 56 |   |   |   |   |
| 4 |   |   | 60 | 4(WC=1) | 4 |
| 5 | 60 |   |   |   |   |
| 6 |   | 12 |   |   |   |
| 7 | 48 |   |   |   |   |
| 8 |   |   | 56 | 4(WC=1) | 8 |
| 9 | 56 or 52 |   |   |   |   |
| 10 |   |   | 61 | 4(WC=1) | 5 |
| 11 | 61 or 56 |   |   |   |   |
| 12 |   |   | 64 | 0(WC=0) | 3 |
| 13 | 64 or 61 |   |   |   |   |

*FIG. 3B*

WRITE CREDITS MANAGEMENT FOR NON-VOLATILE MEMORY

CROSS-REFERENCE TO RELATED APPLICATIONS

The present application for patent claims the benefit of Provisional Patent Application No. 62/579,715 entitled "WRITE CREDITS MANAGEMENT FOR NON-VOLATILE MEMORY" filed Oct. 31, 2017, and assigned to the assignee hereof and hereby expressly incorporated herein by reference in its entirety

FIELD OF DISCLOSURE

Disclosed aspects are directed to managing write operations for non-volatile memory systems. More particularly, exemplary aspects of this disclosure are directed to the use and management of write credits for write operations directed to non-volatile memory, such as non-volatile dual in-line memory module (NVDIMM) and persistent NVDIMM (NVDIMM-P).

BACKGROUND

For some memory systems, there is an expectation of persistence of write operations thereto, which means that information written to the memory system, and classified as a persistent write, is not to be lost, even if there is a loss of power or a system crash, for example, while execution of the persistent write operation is in progress and has not been completed. For a write operation to be persistent, a host (e.g., processor) or application thereof requesting the write operation, may expect explicit confirmation that the write operation has reached the persistent memory. By contrast, write operations to non-persistent memory (such as dynamic random access memory (DRAM) or other volatile memory) are conventionally considered to be completed or posted, from the perspective of the application, once the write operation and associated data have been transferred to the memory and no explicit confirmation that the data has been written is required.

Non-volatile memory (NVM) such as non-volatile dual in-line memory module (NVDIMM) comprising a series of DRAM integrated circuits, as known in the art, may be configured to support persistent writes. For example, the NVDIMMs may be energy-backed in one implementation which supports persistent writes, although other implementations for supporting persistent writes are also known. An NVDIMM which supports persistent writes is also known as NVDIMM-P. A host device may be configured to send write requests including requests for persistent writes to a memory system comprising a NVM, such as an NVDIMM-P. A media controller configured to manage read/write access of the NVDIMM-P may be integrated in the memory system, wherein the media controller may be configured to receive the write requests from the host device and direct the write requests to the NVDIMM-P based on the available resources to support the write requests, e.g., based on available write buffer space in the media controller.

However, in conventional implementations, the write performance from the media controller to the NVM (e.g., NVDIMM-P) may be poor and the speed of the write operations may be slow. This is because in the conventional implementations, as the media controller retires or transfers the write operations to the NVM, the media controller frees up corresponding write buffer space, wherein the freed up write buffer space is in turn converted into write credits to be returned to the host device. A memory controller on the host device may be configured to regulate write operations based on the returned write credits in an effort to restrict the amount of write traffic to the memory system to not exceed the write buffer space.

However, there may be errors, e.g., an uncorrectable error (UE) on returning write credits from the media controller to the host device. The memory controller may detect such errors by performing error checks, e.g., parity checks or using error control coding (ECC), etc., as known in the art. However, when such errors are detected, the memory controller, in conventional implementations, may not be able to simply retry the write operations which may have incurred errors on their corresponding returning write credits. This is because the media controller is not aware of the error in the returning write credits and so the media controller would not have updated its write buffer space to account for the write operations which were not correctly retired, and so there would be dissonance between the write credits reported to the host device and the available write buffer space on the media controller.

Accordingly, there is a recognized need for efficient synchronization of the write credits between the host device and the media controller, e.g., to avoid the aforementioned problems in scenarios wherein errors may be incurred on the reporting of write credits from the media controller to the host device.

SUMMARY

Exemplary aspects of the invention include systems and methods for synchronizing write credits between a host device and a media controller of a memory system comprising a non-volatile memory (NVM). The host device is configured to maintain a write credit (WC) counter implemented in a memory controller of the host device. The WC counter tracks and limits the number of outstanding write commands which may be issued to the NVM. The host device may query the memory system to obtain status of the available write buffer space in the media controller, and adjust the WC counter based on any detected errors in the write buffer space reported in metadata of read packets sent from the memory system.

For example, an exemplary aspect is directed to a method of accessing a memory system, the method comprising setting a write credit counter in a host device to reflect available write buffer space of a write buffer in the memory system, decrementing the write credit counter upon issuing a write command from the host device to the memory system, and incrementing the write credit counter upon receiving at the host device, an indication of additional available write buffer space in the write buffer, from the memory system.

Another exemplary aspect is directed to an apparatus comprising a host device comprising a write credit counter, wherein the host device is coupled to a memory system comprising a write buffer. The host device is configured to set the write credit counter to reflect available write buffer space of the write buffer, decrement the write credit counter upon issuing a write command to the memory system, and increment the write credit counter upon receiving indication of additional available write buffer space in the write buffer, from the memory system.

Another exemplary aspect is directed to a non-transitory computer-readable storage medium comprising code, which, when executed by a processor, causes the processor to perform operations for accessing a memory system. The non-transitory computer-readable storage medium comprises code for setting a write credit counter in a host device to reflect available write buffer space of a write buffer in the memory system, code for decrementing the write credit counter upon issuing a write command from the host device to the memory system, and code for incrementing the write credit counter upon receiving at the host device, an indication of additional available write buffer space in the write buffer, from the memory system.

Yet another exemplary aspect is directed to an apparatus comprising a host device coupled to a memory system, the host device comprising means for tracking write credits, the write credits reflecting available write buffer space of a write buffer in the memory system. The means for tracking write credits comprises means for decrementing the write credits upon the host device issuing a write command to the memory system, and means for incrementing the write credits upon receiving at the host device, an indication of additional available write buffer space in the write buffer, from the memory system.

BRIEF DESCRIPTION OF THE DRAWINGS

The accompanying drawings are presented to aid in the description of aspects of the invention and are provided solely for illustration of the aspects and not limitation thereof.

FIGS. 2A-C illustrate metadata formats for including information on write buffer space reported from a memory system to a host according to exemplary aspects of write credit returns.

FIGS. 3A-B illustrate examples of write credit reporting, according to this disclosure.

DETAILED DESCRIPTION

Figure 1:
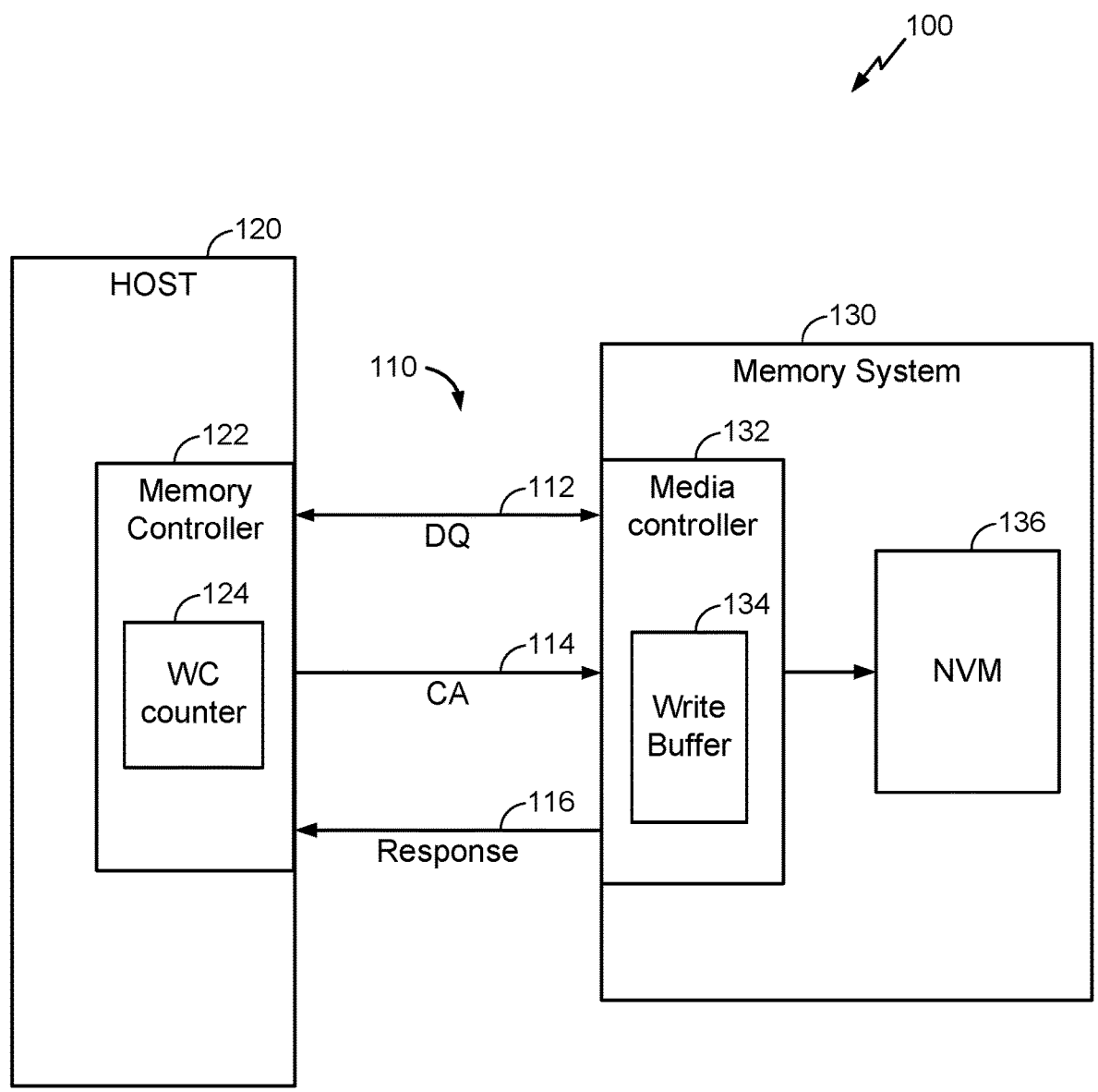
FIG. 1 illustrates a processing system according to aspects of this disclosure

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise.

It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to efficient systems and methods for synchronizing write credits between a host device and a media controller of a memory system comprising a non-volatile memory (NVM). The host device is configured to maintain a write credit (WC) counter, e.g., implemented in a memory controller of the host device, which tracks and limits the number of outstanding write commands which may be issued to the NVM. The host device may query the memory system to obtain status of the available write buffer space in the media controller, and adjust the WC counter based on any detected errors.

The NVM can comprise a NVDIMM-P for example, which may be configured according to any technology without deviating from the scope of this disclosure. Double-data rate 4 (DDR4) implementation of NVDIMM-P (or DDR4 NVDIMM-P) and double-data rate 5 (DDR5) implementation of NVDIMM-P (or DDR5 NVDIMM-P) are discussed for the sake of explanation of exemplary aspects of this disclosure.

With reference now to FIG. 1, an exemplary processing system 100 is shown comprising a host device labeled host 120 and memory system 130. Host 120 can comprise one or more processing elements such as a central processing unit (CPU), digital signal processor (DSP), multimedia processor, system processor, graphics processing unit (GPU), modulator-demodulator (modem), applications processor, etc., even though they have not been explicitly illustrated. These processing elements may make requests for accessing memory system 130. Memory controller 122 of host 120 may be configured to control these access requests. In an exemplary aspect, memory controller 122 may maintain write credit (WC) counter 124, although a WC counter according to this disclosure may be configured in any other manner within host 120.

Memory system 130 may comprise non-volatile memory (NVM) 136, configured as a NVDIMM or NVDIMM-P (e.g., DDR4 or DDR5) in example aspects. NVM 136 may comprise one or more memory banks, which are not specifically illustrated. Access, such as for reads and writes to NVM 136 may be controlled by media controller 132. For write operations, write buffer 134 may be provided in media controller 132 as shown in the example illustration or in various other aspects, a suitable write buffer may be suitably provided in any other manner without deviating from the scope of this disclosure. Write data for write operations received from host 120 to be written to NVM 136 may be temporarily stored in write buffer 134 before the write data is transferred to NVM 136. If a response is required to report completion of the transfer (e.g., for persistent writes), the write operation may be considered to be retired upon the successful reporting of the write completion, or otherwise, the write operation may be considered to be retired upon the write data being transferred from write buffer 134 to NVM 136. NVM 136 may support persistent memory writes (PWRITEs) and write operations with accompanying parity information, e.g., a logical exclusive OR (XOR), referred to as an XWRITE.

Interconnect 110 is shown between host 120 and memory system 130, with standard interfaces such as data bus (DQ) 112, command and address bus (CA) 114 shown. Host 120 may be able to provide commands (including write requests such as PWRITE and XWRITE) and related addresses for memory access requests via CA 114 and send/receive data via DQ 112 (shown as a two-way bus). A bus labeled response 116, although shown separately, may be configured as a part of CA 114 and may be implemented as a bidirectional bus in some cases. Response 116 may be used to provide information to host 120 regarding available space in write buffer 134, for example, as will be discussed in further detail in the following sections. Various other buses/wires may also be present in interconnect 110 although these have not been separately identified.

In an exemplary aspect, WC counter 124 is configured to track the number of outstanding XWRITE or PWRITE commands issued to memory system 130, with the intent of limiting the number of outstanding XWRITE or PWRITE commands based on the available write buffer space in write buffer 134. In one aspect, WC counter 124 may be initialized to a known value or reset to a base value such as zero (e.g., at the start of an application or periodically). Upon initialization, host 120 may be configured to query memory system 130 to determine the available write buffer space and use this information to preset WC counter 124 to reflect the available write buffer space (e.g., the number of lines (or blocks) available in write buffer 134 may be converted to a proportional number which may be tracked by presetting WC counter 124 to the proportional number) and correspondingly increasing or decreasing the count in WC counter 124 as the available write buffer space changes, and wherein the changes in the available write buffer space may be tracked as follows.

Host 120 may be configured to read the available write buffer space using a command such as a READ_STATUS command (which may be sent on CA 114, for example). The READ_STATUS command may be encoded as an XREAD command, as known in the art, with read IDs (RIDs) set to all 1s or 0xFF in hexadecimal notation in one example implementation. Memory system 130, e.g., through media controller 132 may provide a response RD_RDY (e.g., on response 116) when a status packet comprising information pertaining to the available write buffer space is ready to be delivered to host 120. Host 120 may then issue a SEND command to memory system 130, and any subsequent data packet received on DQ 112 from memory system 130 with its RID set to 0xFF may be treated as a message packet by host 120, e.g., by memory controller 122 in a specific implementation. The message packet so received may contain information pertaining to the available write buffer space.

Upon obtaining the available write buffer space in the above-described manner, host 120, or specifically, memory controller 122 may be configured to set or preset WC counter 124 with the corresponding value. Subsequently upon each XWRITE or PWRITE command being issued to memory system 130, memory controller 122 may be configured to decrement WC counter 124 in correspondence (e.g., by "1"). When WC counter 124 reaches a value of "0", memory controller 122 may be configured to stop or prevent any further XWRITE or PWRITE command being issued on CA 114 from host 120 to memory system 130.

In exemplary aspects, memory system 130 may be configured to provide incremental write credit feedback to the host as part of metadata included in one or more read data packets, or in some instances, in each read data packet returned from memory system 130 to host 120 in response to the above-described SEND command. The incremental write credit reporting may vary based on particular implementations. For instance, depending on specific configurations for a DDR4 NVDIMM-P implementation of NVM 136, this feedback may be a 1-bit programmable WC return value (PWC) or a 3-bit encoding for write credits (e.g., represented by WC [2:0]). The write credits (e.g., represented by WC [2:0]) returned in the feedback is also referred to as read metadata, and may represent a number of write credits that host 120 may add to its available write credit count (e.g., increment WC counter 124 by a corresponding amount).

In some aspects, a multi-bit programmable write credit value such as WC [2:0] may be an encoding (e.g., a binary representation) of a specific number of write credits. In alternative aspects, e.g., as shown in FIG. 2C, the value of WC [2:0] may correspond to a pre-programmed number of credits associated with a response. For instance, different encodings or combinations of the bit values of WC [2:0], identified as bits [WC2, WC1, WC0] in FIG. 2C may represent different numbers of write credits, representatively shown in the range of 0 to 64. These pre-programmed values may be obtained by a table using the bits of WC [2:0] as an index into the table, in some implementations.

The write credits returned when the 1-bit programmable WC return value (PWC) is used may represent a preprogrammed number of credits to be added to the write credit count of host 120 (e.g., increment WC counter 124 by a corresponding amount). A mode register bit setting, e.g., a bit at a suitable location of the mode register being set, may be used to select one of two possible configurations of the DDR4 NVDIMM-P implementation. For a DDR5 NVDIMM-P implementation of NVM 136, a 3-bit encoding for write credits (e.g., WC [2:0]) may be used.

Host 120 may increment WC counter 124 by the number of write credits encoded in PWC or WC [2:0] encoding (depending on the DDR4 or DDR5 implementations noted above) returned by memory system 130. The total write buffer space available on media controller 132 can be 64 or greater in different implementations. The write credits may represent the number of writes that media controller 132 has retired to NVM 136 and hence freed up more buffer space in write buffer 134 as noted above.

In exemplary aspects, host 120 may also request, at any time, the total write buffer space available in write buffer 134 by issuing a READ_STATUS command and updating its WC counter 124 accordingly. As an example, host 120 may send the READ_STATUS command when there are no SEND commands available to issue and its WC counter 124 is at a value of "0", preventing issuance of further writes.

In another example, host 120 may issue a READ_STATUS command to update its WC counter 124 based on the available write buffer space in write buffer 134 when host 120 detects an uncorrectable error (UE) on a read data packet. For instance memory controller 122 may run an error check on a received packet from memory system 130 and discover that there was an error, which would render the PWC or WC [2:0] fields (depending on the DDR4 or DDR5 implementations noted above) contained in the read data packet invalid.

In some aspects, memory system 130 may provide the total value of write buffer space based on the time at which media controller 132 receives the READ_STATUS command. On any subsequent messages comprising write credits or write buffer space returned to host 120, media controller 132 may take into account the last value of the total write buffer space sent to host 120 in response to a READ_STATUS command received. Accordingly, memory system 130 may return the appropriate write credits based on the additional write buffer space freed up as write operations are completed or retired, as explained in the following sections.

In an illustrative example, write buffer space in write buffer 134 may be 128 (e.g., 128 lines or blocks). If host 120 issues 10 writes, for example, and 3 of these writes were completed to NVM 136 or retired before media controller 132 receives a READ_STATUS command from host 120, then media controller 132 may return a total write buffer space available value of 128−10+3=121 back to host 120 in response.

In some aspects, memory system 130 may also return additional credits as part of the reported total write buffer space if corresponding additional intervening writes to NVM 136 may be completed after receiving a READ_STATUS command and before the status message is sent back on DQ 112, for example.

In an illustrative example, write buffer space in write buffer 134 may be 128 as previously indicated. If host 120 issues 10 writes, for example, and 3 of these writes were completed to NVM 136, or retired before media controller 132 receives a READ_STATUS command from host 120, and two more writes are completed to NVM 136 in the interim duration after the READ_STATUS packet is received but before the status packet with the write credits value is sent to host 120, then media controller 132 may return a total write buffer space available value of 128−10+3+2=123 back to host 120 in response.

In one possible scenario, media controller 132 may receive a write request after the READ_STATUS is received and complete the write request before the status is reported back. In this scenario, media controller 132 may be configured to not take this additional freed up space in write buffer 134 corresponding to the completed write request into account when reporting the total write buffer space, but rather report the corresponding write credit back in subsequent write credit returns reported.

From the perspective of host 120, the returned total write buffer space is not taken into account in the write commands issued by host 120 after issuing the READ_STATUS command. Host 120 is configured to subtract from the returned value the number of write commands issued following the READ_STATUS command, even if those write commands are issued before receiving the total write buffer space from media controller 132. Host 120 may continue to adjust the write credit count in WC counter 124 with incremental write credit returns received after receiving the total write buffer space.

In exemplary aspects, the PWC and WC [2:0] bits may be valid for read return data that have Poison bit set to "1" even for metadata bits defined according to other protocols for returning information from memory system 130 to host 120. Poison data is an indication that either host 120 had written bad or "poisoned" data to memory system 130 (or specifically, media controller 132), or host 120 had detected corrupted read data and returned the corrupted read data as bad or unusable, as indicated by the "poisoned" bit. Example metadata packets which may be used in the status packets sent on DQ 112 for example, using 6 bits for reporting an accurate number of write credits (up to 64 write credits) may follow the format shown in FIG. 2C.

FIG. 2A illustrates a data beat according to a DDR4 standard, for example, showing the poison bit set to 1 and WC [2:0] bits to indicate the number of write credits reported in a response packet sent on DQ 112 in response to a READ_STATUS command from host 120. The DDR4 NVDIMM-P implementation of NVM 136 may allow two configurable options for selecting the number of write credit bits and user defined bits in the read metadata packet. If a Mode Register MRx bit y of the metadata packet is set to "0" then three write credit bits and four USER bits may be available as shown in FIG. 2A.

FIG. 2B shows a single write credit bit (PWC) and six USER bits available if Mode Register MRx bit y is set to "1".

FIG. 2C shows an example encoding for three write credit bits according to DDR4 or DDR5 NVDIMM-P implementations. For example, memory system 130 of FIG. 1 may return the best encoding that is equal to or less than the actual number of credits to be returned.

For the DDR4 NVDIMM-P implementation of NVM 136, the PWC bit represents a programmable write credit threshold value. This value may be programmed by host 120 in mode register location MRx bits n (2:0) using the same encoding as the above-described implementations with three write credit bits. Memory system 130 may not start using the PWC value in its reporting until it receives READ_STATUS from host 120 to obtain the total write buffer space. The write credits obtained using the READ_STATUS is also referred to as the credits based on a status read. The 3-bit PWC field may be returned in the READ_STATUS packet as well, and as previously mentioned, these write credits are referred to as the credits obtained from read metadata. The change of incremental write credit value may take effect after the total write buffer space is returned.

In exemplary aspects, if PWC=0 then no credits are returned to host 120. If PWC=1 then write credits based on the programmed value may be returned to the host 120.

FIGS. 3A-B illustrate numerical examples with three write credit bits and one write credit bit used in the read packet metadata for reporting the write credits to host 120. In FIGS. 3A-B, the column shown as "available for return" may represent the status of media controller 132, for example.

As shown in FIG. 3A, when three write credit bits are used, 1, 2, 4, 8, 16, 32, and 64 credits may be reported using various binary encodings of the 3-bits. As shown, host 120 may utilize the write credits provided through the response to the READ_STATUS (or the credits based on the status read), as well as write credits obtained from read metadata such as the PWC bit. In some implementations, status read and the read metadata may be restricted from being returned simultaneously to host 120 from memory system 130. Thus, write credit count for host 120 when write credits are returned through either the status read or the read metadata are shown in the examples of FIG. 3A.

As shown in FIG. 3B, using only 1-bit for the write credit may return only a single value (e.g., 4 in the example shown) based on a preset threshold in each read packet's metadata. FIG. 3B also shows that host 120 may utilize the write credits from the status read as well as the read metadata (even though they may not be returned simultaneously in some implementations, as noted above). More specifically, FIG. 3B also shows the write credit count for host 120 based on write credits returned from either the status reads or the read metadata. As previously noted, the "available for return" may indicate the write credits that media controller 132 may be ready to return, but potential variations between the available for return and the read metadata values returned to host 120 may not be detectable by host 120, as race conditions may exist wherein media controller 132 may not have processed additional write credits.

Figure 4:
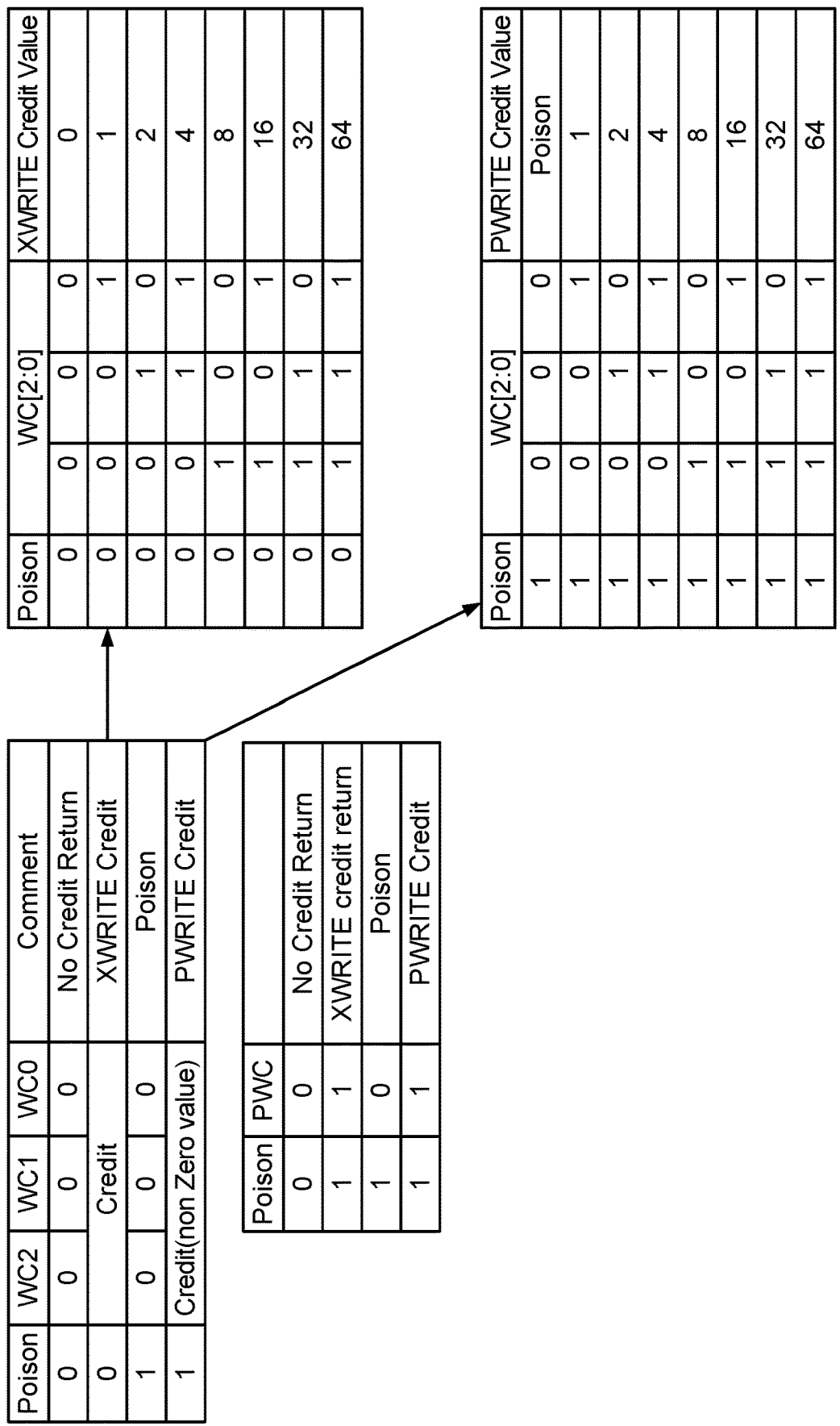
FIG. 4 illustrates aspects of separating write credit reporting for XWRITEs and PWRITEs, according to aspects of this disclosure.

Referring now to FIG. 4, aspects of using separate write credits for reporting write buffer space for PWRITEs and XWRITEs is shown. Separating out the write credits in this manner may improve the speed at which XWRITE credits may be returned from memory system 130 to host 120. The separation may also enable media controller 132 to provide energy-backing to a subset of the total write buffer space. The metadata for reporting the write credits in read packets may be combined with poison bits to obtain additional encoding options for reporting extra credit returns.

In aspects wherein the XWRITE and PWRITE credit reporting may be separated, a common PWC threshold value may be used for the XWRITE and PWRITE credit reporting, with the option to use separate corresponding thresholds based on user preferences. Separate 3-bit fields may be used for respective XWRITE and PWRITE credit reporting. The total write buffer space returned with status packets can have separate fields for XWRITE and PWRITE credits, which can result in fixed allocation for XWRITEs and PWRITEs. Host 120 may be configured to allocate some of the PWRITE space to XWRITEs. Host 120 may also program a register (not shown) in media controller 132 to allocate the space between the PWRITE and XWRITE credits.

Figure 5:
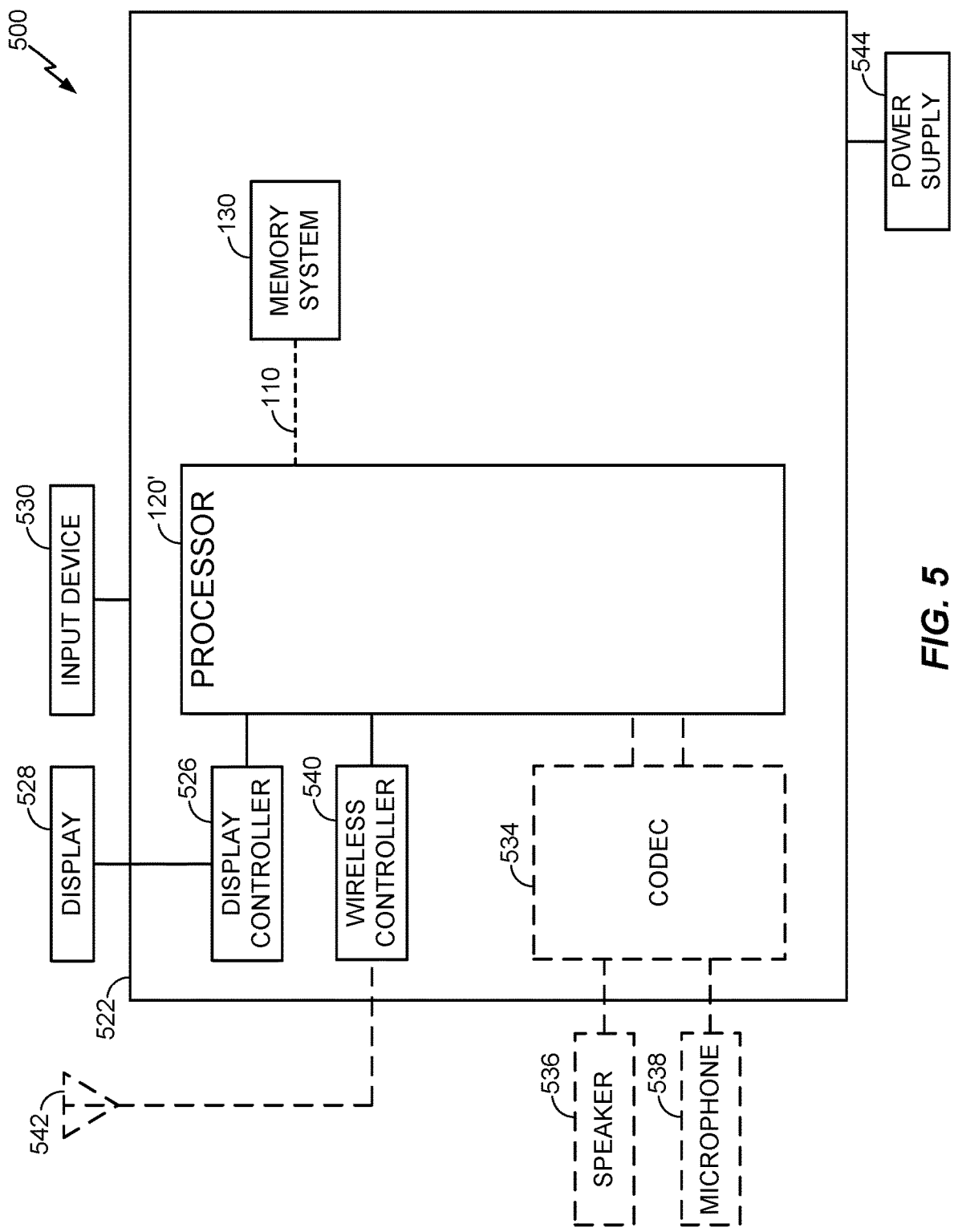
FIG. 5 depicts an exemplary computing device in which an aspect of the disclosure may be advantageously employed.

An example apparatus in which aspects of this disclosure may be utilized, will now be discussed in relation to FIG. 5. FIG. 5 shows a block diagram of computing device 500. Computing device 500 may correspond to an exemplary implementation of a processing system 100 of FIG. 1, wherein processor 120' may be one of the processing elements of host 120. Processor 120' is exemplarily shown to be coupled to memory system 130 through interconnect 110, with further details of interconnect 110 omitted from this view for the sake of clarity. It will be understood that other memory configurations known in the art such as involving one or more levels of caches, although not shown, may be present in computing device 500.

FIG. 5 also shows display controller 526 that is coupled to processor 120' and to display 528. In some cases, computing device 500 may be used for wireless communication and FIG. 5 also shows optional blocks in dashed lines, such as coder/decoder (CODEC) 534 (e.g., an audio and/or voice CODEC) coupled to processor 120' and speaker 536 and microphone 538 can be coupled to CODEC 534; and wireless antenna 542 coupled to wireless controller 540 which is coupled to processor 120'. Where one or more of these optional blocks are present, in a particular aspect, processor 120', display controller 526, memory system 130, and wireless controller 540 are included in a system-in-package or system-on-chip device 522.

Accordingly, a particular aspect, input device 530 and power supply 544 are coupled to the system-on-chip device 522. Moreover, in a particular aspect, as illustrated in FIG. 5, where one or more optional blocks are present, display 528, input device 530, speaker 536, microphone 538, wireless antenna 542, and power supply 544 are external to the system-on-chip device 522. However, each of display 528, input device 530, speaker 536, microphone 538, wireless antenna 542, and power supply 544 can be coupled to a component of the system-on-chip device 522, such as an interface or a controller.

It should be noted that although FIG. 5 generally depicts a computing device, processor 120' and memory system 130, may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

Figure 6:
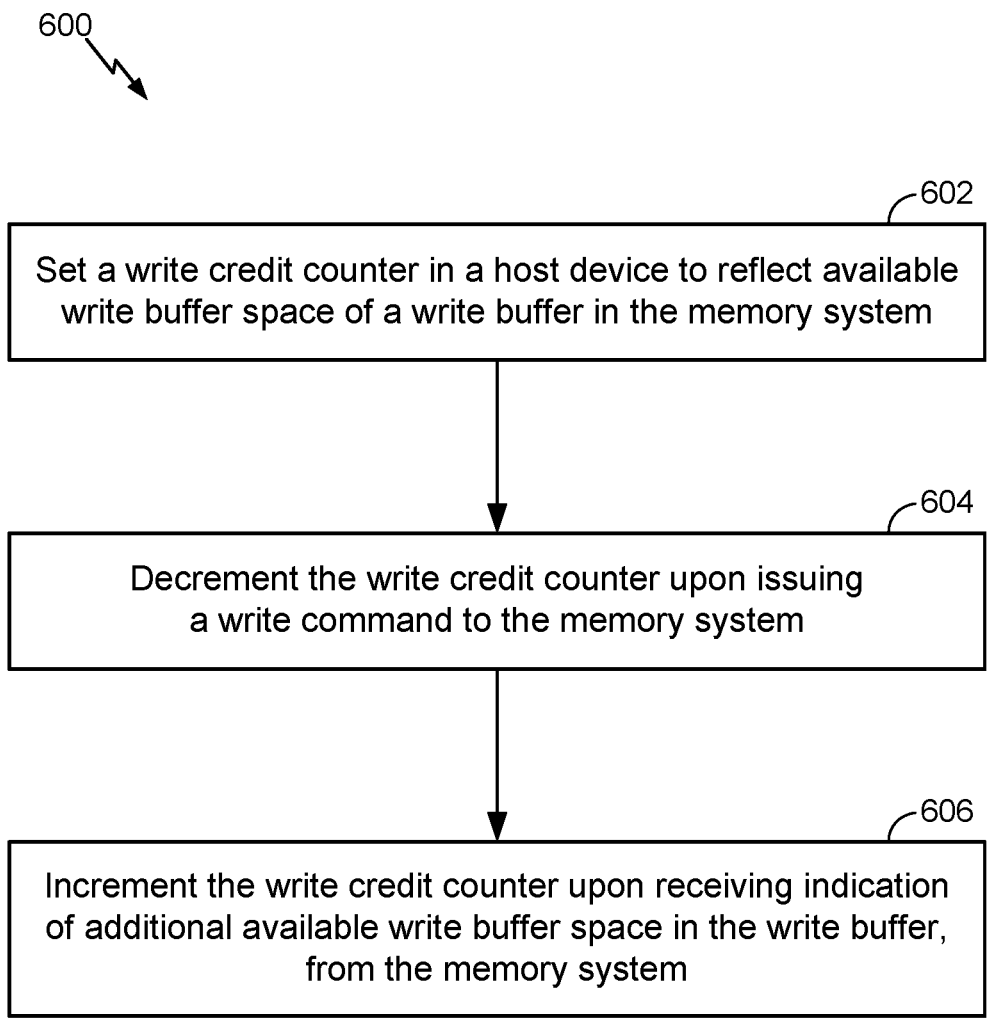
FIG. 6 illustrates an exemplary method of synchronizing write credits of a host device and available write buffer space of a memory system, according to aspects of this disclosure.

It will be appreciated that exemplary aspects include various methods for performing the processes, functions and/or algorithms disclosed herein. For example, FIG. 6 illustrates a method 600 of accessing a memory system. For example, method 600 may be directed to synchronizing write credits of host 120 and available write buffer space in write buffer 134 of memory system 130.

Block 602 includes setting a write credit counter in a host device to reflect available write buffer space of a write buffer in the memory system. For example, WC counter 124 of host 120 may be initialized or set based on determination of available write buffer space in write buffer 134 from a previous process, such as method 600.

Block 604 comprises decrementing the write credit counter upon issuing a write command to the memory system. For example, upon issuance of each PWRITE or XWRITE by host 120, WC counter 124 may be decremented correspondingly.

Block 606 comprises incrementing the write credit counter upon receiving indication of additional available write buffer space in the write buffer, from the memory system. For example, when host 120 receives in response to a read status (READ_STATUS) command, one or more read packets with available write buffer space, if there is additional available write buffer space than the corresponding WC counter 124 value, WC counter 124 is correspondingly incremented.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable media embodying a method of reporting write credits from a memory system comprising NVM to a host. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of accessing a memory system, the method comprising:
    setting a write credit counter in a host device to reflect available write buffer space of a write buffer in the memory system;
    decrementing the write credit counter upon issuing a write command from the host device to the memory system, the write command being a persistent memory write (PWRITE) or a write with accompanying parity information (XWRITE); and
    incrementing the write credit counter upon receiving at the host device, an indication of additional available write buffer space in the write buffer, based on separate PWRITE and XWRITE credit reporting, from the memory system,
    wherein for a PWRITE command, the host receives an explicit confirmation of a write operation reaching persistent memory,
    wherein for an XWRITE, the accompanying parity information is an exclusive OR (XOR) parity information, and
    wherein the indication of additional available write buffer space comprises one or more bits encoding a number of write credits for incrementing the write credit counter in which a range of the number of write credits encoded within the indication of additional available write buffer space is greater than a range of bit values of the indication of additional available write buffer space.

2. The method of claim 1, wherein the additional available write buffer space in the write buffer is based on write operations from the write buffer being written to a non-volatile memory in the memory system.

3. The method of claim 1, comprising receiving separate indications for additional available write buffer space for PWRITE and WRITE in the write buffer, from the memory system.

4. The method of claim 1, further comprising receiving the indication of available write buffer space in the write buffer from the memory system in response to a read status command sent to the memory system by the host device.

5. The method of claim 4, comprising receiving the indication of the available write buffer space in metadata of one or more read data packets from the memory system.

6. The method of claim 5, wherein the indication comprises one of a programmable write credit value, an encoding for write credits, or a mode register bit setting.

7. The method of claim 5, further comprising performing an error check, by the host device, on the one or more read data packets.

8. The method of claim 7, further comprising, determining, by the host device, an error in the one or more read data packets based on the error check, and issuing another read status command to the memory system.

9. The method of claim 1, further comprising preventing write commands being issued by the host device to the memory system if the write credit counter reaches a value of zero.

10. An apparatus comprising:
    a host device comprising a write credit counter, wherein the host device is coupled to a memory system comprising a write buffer, wherein the host device is configured to:
        set the write credit counter to reflect available write buffer space of the write buffer;
        decrement the write credit counter upon issuing a write command to the memory system, the write command being a persistent memory write (PWRITE) or a write with accompanying parity information (WRITE); and
        increment the write credit counter upon receiving an indication of additional available write buffer space in the write buffer, based on separate PWRITE and XWRITE credit reporting, from the memory system,
    wherein for a PWRITE command, the host receives an explicit confirmation of a write operation reaching persistent memory,
    wherein for an XWRITE, the accompanying parity information is an exclusive OR (XOR) parity information, and
    wherein the indication of additional available write buffer space comprises one or more bits encoding a number of write credits for incrementing the write credit counter in which a range of the number of write credits encoded within the indication of additional available write buffer space is greater than a range of bit values of the indication of additional available write buffer space.

11. The apparatus of claim 10, wherein the additional available write buffer space in the write buffer is based on write operations from the write buffer written to a non-volatile memory in the memory system.

12. The apparatus of claim 10, wherein the host device is configured to receive separate indications for additional available write buffer space for PWRITE and XWRITE in the write buffer, from the memory system.

13. The apparatus of claim 10, wherein the host device is further configured to receive the indication of available write buffer space in the write buffer from the memory system, in response to a read status command sent to the memory system by the host device.

14. The apparatus of claim 13, wherein the host device is configured to receive the indication of the available write buffer space in metadata of one or more read data packets from the memory system.

15. The apparatus of claim 14, wherein the indication comprises one of a programmable write credit value, an encoding for write credits, or a mode register bit setting.

16. The apparatus of claim 14, wherein the host device is further configured to perform an error check on the one or more read data packets.

17. The apparatus of claim 16, wherein the host device is further configured to determine an error in the one or more read data packets based on the error check, and issue another read status command to the memory system.

18. The apparatus of claim 10, wherein the host device is further configured to prevent write commands from being issued to the memory system if the write credit counter reaches a value of zero.

19. A non-transitory computer-readable storage medium comprising code, which, when executed by a processor, causes the processor to perform operations for accessing a memory system, the non-transitory computer-readable storage medium comprising:
   code for setting a write credit counter in a host device to reflect available write buffer space of a write buffer in the memory system;
   code for decrementing the write credit counter upon issuing a write command from the host device to the memory system, the write command being a persistent memory write (PWRITE) or a write with accompanying parity information (XWRITE); and
   code for incrementing the write credit counter upon receiving at the host device, an indication of additional available write buffer space in the write buffer, based on separate PWRITE and XWRITE credit reporting, from the memory system,
   wherein for a PWRITE command, the host receives an explicit confirmation of a write operation reaching persistent memory,
   wherein for an XWRITE, the accompanying parity information is an exclusive OR (XOR) parity information, and
   wherein the indication of additional available write buffer space comprises one or more bits encoding a number of write credits for incrementing the write credit counter in which a range of the number of write credits encoded within the indication of additional available write buffer space is greater than a range of bit values of the indication of additional available write buffer space.

20. The non-transitory computer-readable storage medium of claim 19, wherein the additional available write buffer space in the write buffer is based on write operations from the write buffer being written to a non-volatile memory in the memory system.

21. The non-transitory computer-readable storage medium of claim 19, further comprising code for receiving separate indications for additional available write buffer space for PWRITE and WRITE in the write buffer, from the memory system.

22. The non-transitory computer-readable storage medium of claim 19, further comprising code for receiving the indication of available write buffer space in the write buffer from the memory system in response to a read status command sent to the memory system by the host device.

23. The non-transitory computer-readable storage medium of claim 22, further comprising code for receiving the indication of the available write buffer space in metadata of one or more read data packets from the memory system.

24. The non-transitory computer-readable storage medium of claim 23, wherein the indication comprises one of a programmable write credit value, an encoding for write credits, or a mode register bit setting.

25. The non-transitory computer-readable storage medium of claim 23, further comprising code for performing an error check, by the host device, on the one or more read data packets.

26. The non-transitory computer-readable storage medium of claim 25, further comprising, code for determining, by the host device, an error in the one or more read data packets based on the error check, and code for issuing another read status command to the memory system.

27. An apparatus comprising:
   a host device coupled to a memory system, the host device comprising means for tracking write credits, the write credits reflecting available write buffer space of a write buffer in the memory system, wherein the means for tracking write credits comprises:
      means for decrementing the write credits upon the host device issuing a write command to the memory system, the write command being a persistent memory write (PWRITE) or a write with accompanying parity information (XWRITE); and
      means for incrementing the write credits upon receiving at the host device, an indication of additional available write buffer space in the write buffer, based on separate PWRITE and XWRITE credit reporting, from the memory system,
   wherein for a PWRITE command, the host receives an explicit confirmation of a write operation reaching persistent memory,
   wherein for an XWRITE, the accompanying parity information is an exclusive OR (XOR) parity information, and
   wherein the indication of additional available write buffer space comprises one or more bits encoding a number of write credits for incrementing the write credit counter in which a range of the number of write credits encoded within the indication of additional available write buffer space is greater than a range of bit values of the indication of additional available write buffer space.

* * * * *